Aug. 9, 1932.     A. W. KIMBELL     1,871,378
SLIDE FASTENER
Filed Oct. 18, 1930
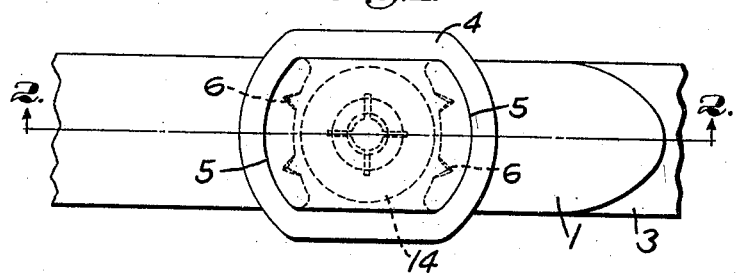
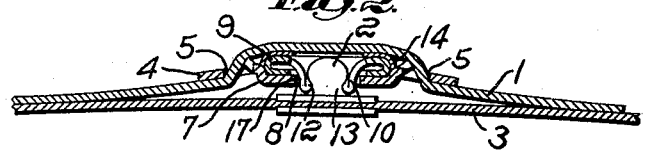
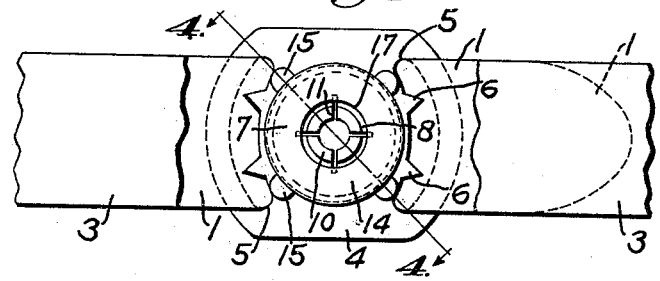
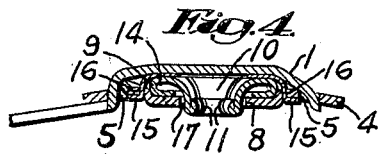
Inventor:
Arthur W. Kimbell Patented Aug. 9, 1932

1,871,378

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

SLIDE FASTENER

Application filed October 18, 1930. Serial No. 489,625.

My invention aims to provide improvements in slide fasteners adapted to be attached to straps and the like and adjustably secured thereto.

In the drawing which illustrates a preferred embodiment of my invention:—

Figure 1 is a plan view of a complete fastener installation embodying my improved slide fastener socket;

Fig. 2 is a section taken on the line 2—2 of Figure 1, the stud member being illustrated in full lines;

Fig. 3 is an under side plan view of the slide socket; and

Fig. 4 is a section taken on the line 4—4 of Fig. 3.

Referring to the particular slide fastener illustrated in the drawing, I have shown a socket member adjustably secured to a strap 1 and adapted to engage a stud member 2 secured to a support 3, as best illustrated in Fig. 2.

Heretofore, adjustable slide sockets used commercially were constructed in such a manner that a wire spring member was used for cooperative engagement with a stud member. There have in the past been various attempts to construct and use slide fastener sockets using yieldable spring fingers formed from sheet metal but the results have not been satisfactory, because of the fact that the fingers could be readily crushed or "set", thereby impairing the operation of the fasteners. For some uses it is desirable to have a slide fastener socket using a sheet metal spring member and, therefore, it is a purpose of my invention to provide a strong, durable socket member of this type which is so constructed and arranged that the spring member cannot become damaged, except by extraordinary misuse.

The socket member which I have selected for illustration by the drawing comprises a plate part 4 having two strap-receiving slots 5 through which the strap 1 may be threaded. The usual prongs 6 or other suitable means adapted to engage the strap 1 to hold the plate in a given position with relation to the strap are located adjacent to the slots 5. The plate part 4 is provided with a cup-shaped portion 7 located between the slots 5 and having an aperture 8 centrally of the bottom thereof.

In the cup-shaped portion 7 I have assembled a sheet metal spring member having a portion 9 which is U-shaped in cross-section and located in the cup-shaped portion 7 and a boss portion 10 extending through the aperture 8 in the bottom of the cup-shaped portion, as illustrated in Figs. 2 and 4. The boss portion 10 of the spring member is divided by a series of slits 11 to permit expansion and contraction thereof and the material at the free end of the boss is bent inwardly to provide neck-engaging portions 12 for engagement with the neck 13 of the stud member 2. The diameter of the free end of the boss portion 10 as it passes through the aperture 8 in the bottom of the cup-shaped portion 7 is slightly less than the diameter of the aperture 8 so that it may expand during engagement with and disengagement from the stud member 2.

The socket structure also includes a cup-shaped member 14 extending over the spring member and secured to the plate 4 by means of a number of ears 15 extending from the edge of the cup-shaped member 14 through slots 16 in the plate member 4 adjacent to the mouth of the cup-shaped portion 7, as clearly illustrated in Fig. 4. The cup-shaped member 14 holds the spring member in assembled relation with the plate 4 and presents a smooth surface for sliding engagement with the strap 1.

The slide fastener device which I have illustrated and described is strong, durable and relatively inexpensive to manufacture. It is particularly adapted for use on the straps of gloves, overshoes, and the like, because the spring member when subjected to lateral stress cannot become "set" because the yieldable portions which engage the stud member 2 are back-supported, after a predetermined amount of expansion, by the wall 17 surrounding the aperture 8 in the bottom of the cup-shaped portion 7. Furthermore the spring cannot be injured by crushing because the cup-shaped portion 7 and the cup-shaped part 9 provide casing means which is strong and can withstand considerable pressure.

The members of the socket device have been assembled in such a manner that when the socket is attached to the strap 1 the bottom of the cup-shaped portion 7 will face toward the stud so that when the strap is pulled to separate the socket from the stud the stress and strain exerted upon the spring member will be transmitted directly against the bottom of the cup-shaped portion 7. Since the cup-shaped portion 7 is formed as an integral part of the plate 4, there can be no tendency to disassemble the parts during disengagement of the socket from the stud.

While I have illustrated and described a preferred embodiment of my invention I do not wish to be limited thereby, because the scope of my invention is best defined by the following claims.

I claim:

1. A slide fastener comprising a plate having strap-receiving slots whereby the plate may be attached in sliding engagement with a strap, a cup-shaped portion formed in said plate between said strap-receiving slots, an expansible and contractible stud-receiving part having a flange portion located in said cup-shaped portion and having a hollow boss portion adapted to engage a cooperating stud, a part attached to said plate over the cup-shaped portion in said plate and cooperating to hold the stud-receiving part in position, said cup-shaped portion and said part having apertures therethrough and said boss extending slightly through one of said apertures for the purposes described.

2. A slide fastener comprising a plate having strap-receiving slots whereby the plate may be attached in sliding engagement with a strap, a cup-shaped portion formed in said plate between said slots, said cup-shaped portion having an aperture through the bottom thereof, a sheet metal stud-engaging member located in said cup-shaped portion and having a split boss, the end of which extends slightly through said aperture in the bottom of said cup-shaped portion and is back-supported by a wall surrounding said aperture to prevent over-expansion and a part attached to said plate and extending over the stud-engaging member to hold it in assembled relation with said plate.

3. A slide fastener socket comprising a plate 4 having strap-receiving slots 5—5 and a cup-shaped portion 7 between the slots 5—5, a cup-shaped part 14 secured to said plate directly over said cup-shaped portion and a sheet metal spring member having a portion 9 located in the space between said cup-shaped portion 7 and said cup-shaped part 14 and a resilient boss 10 extending from said portion 9 through an aperture 8 in the bottom of said cup-shaped portion 7.

In testimony whereof, I have signed my name to this specification.

ARTHUR W. KIMBELL.